April 15, 1930.                O. MELBYE                1,754,691
                                WINDLASS
                            Filed Jan. 17, 1929
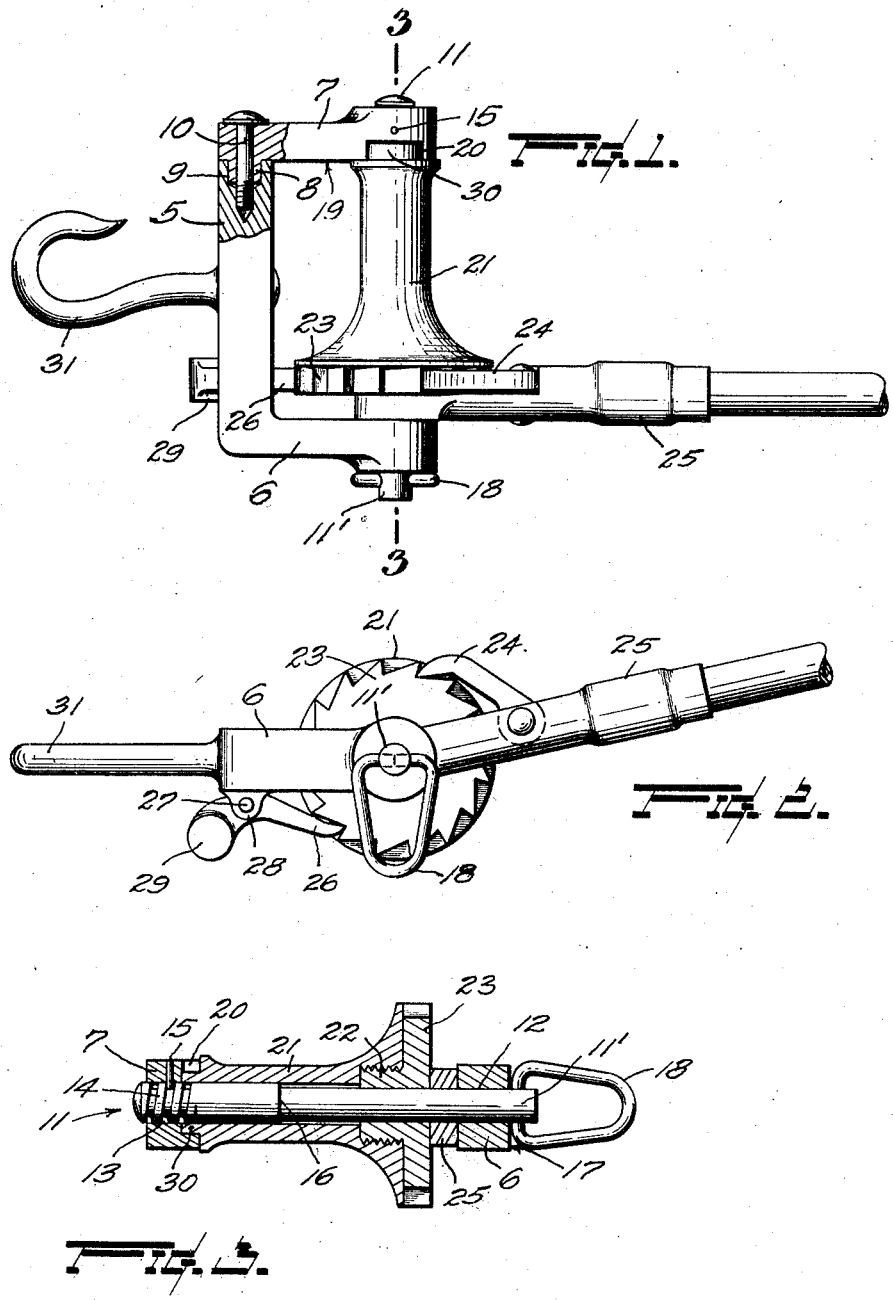
INVENTOR
Oskar Melbye
BY
Pierre Barnes
ATTORNEY Patented Apr. 15, 1930

1,754,691

UNITED STATES PATENT OFFICE

OSKAR MELBYE, OF SEDRO WOOLLEY, WASHINGTON

WINDLASS

Application filed January 17, 1929. Serial No. 333,040.

This invention relates to portable hand windlasses; and its object is the perfecting of apparatus of this character to improve its construction, render it more convenient to use, and capable of withstanding heavy stresses.

The invention consists in the novel manner of mounting the drum within a substantially U-shaped frame wherein one of the arm members is pivotally connected to the transverse bar member to be swung about the axis of the bar member; said arm having a hooked engagement with the frame bar and also with a journal of the drum to reliably couple them together in their respective operative positions; the pivotal connection of the arm member with the bar enabling the referred to arm to be swung away from said journal into a position to fully expose an end of the drum to permit a rope being conveniently looped about the drum.

The invention further consists in the improved manner and means for separably connecting the pivotal frame arm to the drum journal.

The invention further consists in the novel construction, adaptation and combination of parts hereinafter described and claimed.

In the accompanying drawing,—

Figure 1 is a plan view, partly in section, of a hand-windlass embodying my improvements; Fig. 2 is a side elevation of Fig. 1; and Fig. 3 is a transverse section taken substantially on line 3—3 of Fig. 1.

In said drawing, the reference numeral 5 represents the transverse bar member of a substantially U-shaped frame having two arms 6 and 7 disposed in substantially parallel and at right angles to the axis of the bar member.

The arm 6 is integral or rigid with the bar 5, and the other arm 7, is pivotally connected to an end of the bar 5 to enable it being swung about an axis longitudinal of the bar.

As shown in Fig. 1, such pivotal connection is obtained by the provision of a cylindrical boss 8 fitting within a recess 9 provided in the end of said bar, and retaining the pivoted arm to the bar by means of a screw bolt 10 extending through the arm and bar axially of said boss and said bar.

In proximity to their outer ends the arms 6 and 7 are bored to receive a transverse shaft 11. The ends of said shaft are adapted for rotary and axial movements in the bores 12 and 13 of the respective arms 6 and 7.

The end of the arm associated with the arm 7 is screw threaded, as at 14, for engagement with a stud 15 extending into the arm bore 13. As shown in Fig. 3, the shaft 11 is formed of two diameters, the portion $11^1$ of smaller diameter extending from a peripheral shoulder 16 to beyond the outer side surface 17 of the arm 6. 18 represents a link having its extremities engaged in a hole provided in the outer end of the shaft portion $11^1$, said link serving as a stop with respect to the arm 6 to prevent the withdrawal of the shaft therefrom.

Said link also serves as a crank arm for rotating the shaft to cause its other end to be engaged with or disengaged from the frame arm 7. Provided in the inner side 19 of the arm 7 is a slot 20 which is open at the top and thence extends downwardly to a semicircular bottom concentric with the axis of the adjacent bore 13 of the arm 7.

21 represents a drum which is bored to fit loosely upon the shaft. At the end of the drum about the smaller diameter $11^1$ of the shaft, the drum is rigidly secured to a bushing 22 which serves as a journal bearing for the drum with respect to the shaft.

The bushing 22, as shown, constitutes the hub of a ratchet wheel 23 juxtaposed against an end of the shaft, and said hub also serves as a stop with regard to the shoulder 16 of the shaft to limit the axial displacement of the latter.

24 represents a pawl which is carried by an operating lever 25 mounted upon the shaft between the ratchet wheel and the frame arm 6. A detent dog 26 for said ratchet wheel is connected by a pivotal pin 27 to apertured ears 28 depending from the bar member of the frame. Said dog may be actuated by a spring or, as shown, a counter weight 29 may be utilized to control the action of the dog.

At its other end from said ratchet wheel, the drum is provided with a hub 30 which is adapted to fit within the slot 20 of the pivoted arm 7. Said slot thus serves as a bearing for the drum and provides a hook connection with the drum of the arm 7 which is pivoted to the frame bar 5 for movement in a plane at right angles to the axis of the drum.

31 represents a hook secured to the frame bar 5 for securing the frame to an anchorage or support, or with a cable connection with a support.

The operation of the present invention is as follows: When a rope is to be engaged about the drum 21, the shaft 11 is retracted from the pivoted arm 7 by means of the link 18 which is first used as a lever when in its Fig. 2 position to rotate the shaft to disengage the same from the stud 15 and thereupon pulling the shaft from the arm 6 by means of the link when in its Fig. 3 position. Being thus released, the arm 7 is swung manually about its swivel connection with the bar member 5 of the frame, and in a plane at right angles to the axis of the bar member whereby an opening, or bay, is provided between the bar member and the drum permitting one or more turns of the rope being readily made about the drum. The arm 6 is then swung about its axis of revolution to return into the engaged relation with the hub 30, as represented in Fig. 1, and is thus secured by means of the shaft 11 being reengaged with the arm 7.

The drum is now arranged to be rotated to wind the rope thereabout by means of the lever handle 25 and the medium of the pawl-and-ratchet devices. The rope may be quickly disconnected by lifting the coils of the rope from the drum after withdrawing the shaft from the arm 7 and swinging the latter from its connection with the drum.

What I claim, is,—

1. A windlass comprising, in combination, a U-shaped frame formed with a transverse bar and two apertured arms at the ends thereof, one of said arms being rigid with the bar and the other arm swiveled to the bar for movement in a plane longitudinal of the frame, said swivel connection comprising a boss rigid with the associated arm and rotatable in a recess provided in the bar, a slot provided in the inner side face of said swiveled arm, a transversely arranged shaft engaging in the apertures of both arms, a drum loosely mounted on said shaft, said drum being provided with a hub element adapted to be engaged by the swiveled arm within the slot thereof, an operating lever mounted upon the shaft, and pawl-and-ratchet devices for transmitting motion from the lever to rotate the drum.

2. A windlass comprising, in combination, a U-shaped frame consisting of a transversely arranged bar member having an arm at one end thereof rigid with the bar member, and a second arm swiveled to the other end of the bar member for movement in a plane longitudinal of the frame, a shaft disposed transversely of the frame, said shaft being supported continuously by the rigid arm and detachably engageable with the swiveled arm, a drum loosely mounted upon said shaft, drum-operating means mounted upon the shaft, and pawl-and-ratchet devices for transmitting motion from the drum-operating means to rotate the drum.

Signed at Sedro Woolley, Washington, this 2nd day of January, 1929.

OSKAR MELBYE.